(12) United States Patent
Baek et al.

(10) Patent No.: US 11,190,333 B2
(45) Date of Patent: Nov. 30, 2021

(54) APPARATUS AND METHOD FOR ESTIMATING SYNCHRONIZATION OF BROADCAST SIGNAL IN TIME DOMAIN

(71) Applicant: ELECTRONICS AND TELECOMMUNICATIONS RESEARCH INSTITUTE, Daejeon (KR)

(72) Inventors: Myung-Sun Baek, Daejeon (KR); Sang-Jung Ra, Daejeon (KR); Byungjun Bae, Daejeon (KR); Yong Seong Cho, Daejeon (KR); Hyoung Kyu Song, Seongnam (KR); Won-Seok Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/839,916

(22) Filed: Apr. 3, 2020

(65) Prior Publication Data

US 2020/0322121 A1    Oct. 8, 2020

(30) Foreign Application Priority Data

Apr. 4, 2019    (KR) .......................... 10-2019-0039805

(51) Int. Cl.
*H04L 7/00*    (2006.01)
*H04L 27/26*    (2006.01)

(52) U.S. Cl.
CPC .......... *H04L 7/0033* (2013.01); *H04L 7/0054* (2013.01); *H04L 27/2675* (2013.01)

(58) Field of Classification Search
CPC ............ H04L 27/2663; H04L 27/2613; H04L 27/2675; H04L 27/2671; H04L 27/2692; H04L 5/0048; H04L 27/2656; H04L 27/2665; H04L 27/2649; H04L 27/2672
USPC ........................................... 375/150; 342/137
See application file for complete search history.

(56) References Cited

U.S. PATENT DOCUMENTS

| | | | |
|---|---|---|---|
| 2004/0105512 A1* | 6/2004 | Priotti | ................. H04L 27/2662 375/340 |
| 2011/0156954 A1* | 6/2011 | Roh | ........................ G01S 19/22 342/357.69 |
| 2014/0333836 A1 | 11/2014 | Cho et al. | |
| 2017/0163978 A1 | 6/2017 | Lee et al. | |

FOREIGN PATENT DOCUMENTS

| | | |
|---|---|---|
| EP | 3206391 A1 | 8/2017 |
| KR | 20120098347 A | 9/2012 |
| KR | 101374378 B1 | 3/2014 |

* cited by examiner

*Primary Examiner* — David C Payne
*Assistant Examiner* — Sarah Hassan (57) ABSTRACT

A method and an apparatus for estimating synchronization of a broadcast signal in a time domain using a synchronization estimation signal through steps of: performing a correlation operation using a correlation window on a plurality of synchronization estimation signals separated to a plurality of paths and outputting a plurality of correlated signals; delaying the plurality of correlated signals to output a plurality of delayed signals; and estimating the synchronization using the plurality of delayed signals are provided.

20 Claims, 11 Drawing Sheets

APPARATUS AND METHOD FOR ESTIMATING SYNCHRONIZATION OF BROADCAST SIGNAL IN TIME DOMAIN

CROSS-REFERENCE TO RELATED APPLICATION

This application claims priority to and the benefit of Korean Patent Application No. 10-2019-0039805 filed in the Korean Intellectual Property Office on Apr. 4, 2019, the entire contents of which are incorporated herein by reference.

BACKGROUND OF THE INVENTION

(a) Field of the Invention

The present description relates to an apparatus and method for estimating synchronization of a broadcast signal in a time domain by using a synchronization estimation signal.

(b) Description of the Related Art

The digital broadcasting standard ATSC 3.0, which has been standardized in the United States in 2017, supports 4K, 8K Ultra High Definition (UHD) resolution media that is higher than the HD (High Definition) resolution media supported by the existing ATSC standard.

The ATSC 3.0 standard uses Orthogonal Frequency Division Multiplexing (OFDM) method, unlike the existing standard that uses 8-level Vestigial SideBand Modulation (8VSBM) as the signal transmission method.

The bootstrap signal of a transmission frame of the ATSC 3.0 standard has a repeated pattern (or a repeating section) in the time domain. In the conventional synchronization method for the bootstrap signal, time and frequency domain offsets are estimated by using all repeated patterns. Since the estimation error in the time domain can affect the performance of the estimation in the frequency domain, improvement is required.

SUMMARY OF THE INVENTION

An exemplary embodiment provides an apparatus for estimating synchronization of a signal in a time domain by using a synchronization estimation signal.

Another exemplary embodiment provides a method for estimating synchronization of a signal in a time domain by using a synchronization estimation signal.

According to an exemplary embodiment, an apparatus for estimating synchronization of a broadcast signal in a time domain using a synchronization estimation signal is provided. The apparatus includes: a correlator configured to perform a correlation operation using a correlation window on a plurality of synchronization estimation signals separated to a plurality of paths and output a plurality of correlated signals; a delayer configured to delay the plurality of correlated signals to output a plurality of delayed signals; and a synchronization estimator configured to estimate the synchronization using the plurality of delayed signals, wherein the correlator further configured to perform an over-correlation operation on a first synchronization estimation signal among the plurality of synchronization estimation signals, and to perform a general correlation operation on a second synchronization estimation signal among the plurality of synchronization estimation signals.

When performing the over-correlation operation, the correlator may perform a moving sum operation on the first synchronization estimation signal by using a first correlation window having a first length.

When performing the general correlation operation, the correlator may perform a moving average operation on the second synchronization estimation signal by using a second correlation window having a second length shorter than the first length.

The correlator may include: a first correlator for performing the over-correlation operation on the first synchronization estimation signal separated to a first path among the plurality of paths to generate a first correlated signal and outputting the first correlated signal; a second correlator for performing the general correlation operation on the second synchronization estimation signal separated to a second path among the plurality of paths to generate a second correlated signal and outputting the second correlated signal; and a third correlator for performing the over-correlation operation for a third synchronization estimation signal among the plurality of synchronization estimation signals separated to a third path among the plurality of paths to generate a third correlated signal and outputting the third correlated signal, wherein the over-correlation operation corresponds to a moving sum operation on the first synchronization estimation signal and the third synchronization estimation signal by using a first correlation window having a first length, and the general correlation operation corresponds to a moving average operation on a second synchronization estimation signal by using a second correlation window having a second length shorter than the first length.

When performing the over-correlation operation, the first correlator may perform a dividing operation for a result of the moving sum operation by a third length shorter than the first length.

When performing the over-correlation operation, the third correlator may perform a dividing operation a result of the moving sum operation by the second length.

When outputting the plurality of delayed signals, the delayer may perform delaying the plurality of correlated signals of which shape is trapezoid and outputting the plurality of delayed signals of which shape is triangle with a plurality of identical sample intervals.

The delayer may include: a first delayer for performing an delaying operation on the first correlated signal to generate a first delayed signal and outputting the first delayed signal; a second delayer for performing an delaying operation on the second correlated signal to generate a second delayed signal outputting the second delayed signal; and a third delayer for performing an delaying operation on the third correlated signal to generate a third delayed signal and outputting the third delayed signal.

The synchronization estimator may include: a first estimator for performing a correlation operation on the third delayed signal and a signal delayed from the second delayed signal to generate a first estimated signal, and outputting the first estimated signal; and a second estimator for performing a correlation operation on a signal delayed from the first estimated signal and the first delayed signal to generate a second estimated signal, and outputting the second estimated signal.

According to another exemplary embodiment, a method for estimating synchronization of a broadcast signal in a time domain using a synchronization estimation signal is provided. The method includes: performing a correlation operation using a correlation window on a plurality of synchronization estimation signals separated to a plurality of paths and outputting a plurality of correlated signals; delaying the plurality of correlated signals to output a plurality of delayed signals; and estimating the synchronization using the plurality of delayed signals, wherein the performing a correlation operation using a correlation window on a plurality of synchronization estimation signals separated to a plurality of paths and outputting a plurality of correlated signals includes: performing an over-correlation operation on a first synchronization estimation signal among the plurality of synchronization estimation signals; and performing a general correlation operation on a second synchronization estimation signal among the plurality of synchronization estimation signals.

The performing of the over-correlation operation may include performing a moving sum operation on the first synchronization estimation signal by using a first correlation window having a first length.

The performing of the general correlation operation may include performing a moving average operation on the second synchronization estimation signal by using a second correlation window having a second length shorter than the first length.

The performing a correlation operation using a correlation window on a plurality of synchronization estimation signals separated to a plurality of paths and outputting a plurality of correlated signals may include: performing the over-correlation operation on the first synchronization estimation signal separated to a first path among the plurality of paths to generate a first correlated signal and outputting the first correlated signal; performing the general correlation operation on the second synchronization estimation signal separated to a second path among the plurality of paths to generate a second correlated signal and outputting the second correlated signal; and performing the over-correlation operation on a third synchronization estimation signal among the plurality of synchronization estimation signals separated to a third path among the plurality of paths to generate a third correlated signal and outputting the third correlated signal, wherein the over-correlation operation corresponds to a moving sum operation on the first synchronization estimation signal and the third synchronization estimation signal by using a first correlation window having a first length, and the general correlation operation corresponds to a moving average operation on a second synchronization estimation signal by using a second correlation window having a second length shorter than the first length.

The outputting of the first correlated signal may include performing a dividing operation for a result of the moving sum operation by a third length shorter than the first length.

The outputting of the third correlated signal may include performing a dividing operation for a result of the moving sum operation by the second length.

The delaying the plurality of correlated signals to output a plurality of delayed signals may include delaying the plurality of correlated signals of which shape is trapezoid and outputting the plurality of delayed signals of which shape is triangle with a plurality of identical sample intervals.

The delaying the plurality of correlated signals to output a plurality of delayed signals may include outputting a first delayed signal by delaying the first correlated signal, outputting a second delayed signal by delaying the second correlated signal, and outputting a third delayed signal by delaying the third correlated signal.

The estimating the synchronization using the plurality of delayed signals may include: performing a correlation operation on the third delayed signal and a signal delayed from the second delayed signal to generate a first estimated signal, and outputting the first estimated signal; and performing a correlation operation on a signal delayed from the first estimated signal and the first delayed signal to generate a second estimated signal, and outputting the second estimated signal.

According to yet another exemplary embodiment, an apparatus for estimating synchronization of a broadcast signal in a time domain using a synchronization estimation signal is provided. The Apparatus includes a processor and memory, wherein the processor executes a program stored in the memory to perform: performing a correlation operation using a correlation window on a plurality of synchronization estimation signals separated to a plurality of paths and outputting a plurality of correlated signals; delaying the plurality of correlated signals to output a plurality of delayed signals; and estimating the synchronization using the plurality of delayed signals, wherein when performing the correlation operation using the correlation window on the plurality of synchronization estimation signals separated to the plurality of paths and outputting the plurality of correlated signals, the processor executes the program to perform: an over-correlation operation on a first synchronization estimation signal among the plurality of synchronization estimation signals and a general correlation operation on a second synchronization estimation signal among the plurality of synchronization estimation signals.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification. In this specification, redundant description of the same constituent elements is omitted. Also, in this specification, it is to be understood that when one component is referred to as being "connected" or "coupled" to another component, it may be connected or coupled directly to the other component or may be connected or coupled to the other component with another component intervening therebetween. On the other hand, in this specification, it is to be understood that when one component is referred to as being "connected or coupled directly" to another component, it may be connected or coupled to the other component without another component intervening therebetween. It is also to be understood that the terminology used herein is only used for the purpose of describing particular embodiments, and is not intended to limit the invention. Singular forms are to include plural forms unless the context clearly indicates otherwise. It will be further understood that terms "comprises" and "have" used in the present specification specify the presence of stated features, numerals, steps, operations, components, parts, or a combination thereof, but do not preclude the presence or addition of one or more other features, numerals, steps, operations, components, parts, or a combination thereof. Also, as used herein, the term "and/or" includes any plurality of combinations of items or any of a plurality of listed items. In the present specification, "A or B" may include "A", "B", or "A and B".

Figure 1:
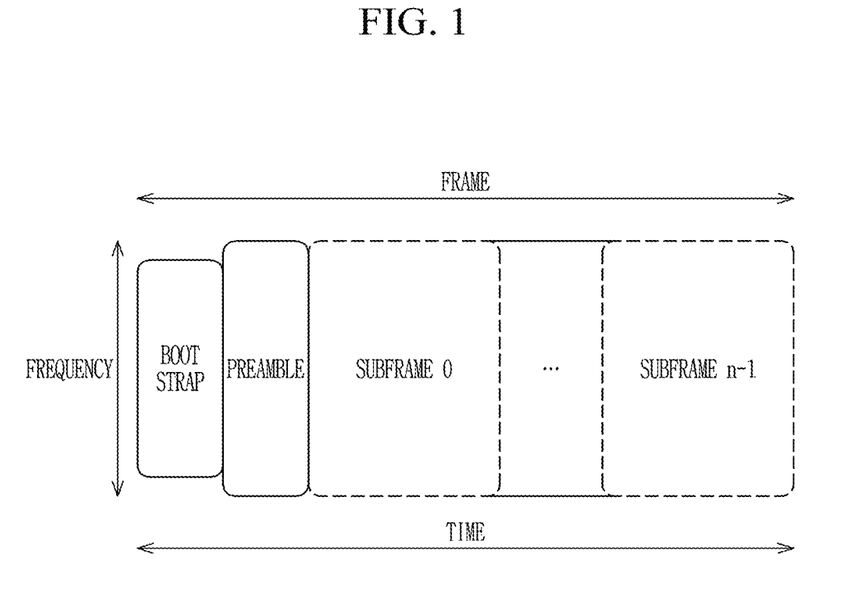
FIG. 1 is a diagram illustrating a structure of a transmission frame of the ATSC 3.0 standard.

FIG. 1 is a diagram illustrating a structure of a transmission frame of the ATSC 3.0 standard.

The bootstrap signal is a signal informing information about a frame and disaster-related information. The bootstrap signal according to an embodiment is an example for a synchronization estimation signal used to estimate a synchronization of a frame, and the description is not limited thereto.

Since the bootstrap signal should be received at a receiving side, the transmission parameters of the bootstrap signal are fixed except for data such as a sampling interval for the bootstrap signal, a fast Fourier transform (FFT) size, and subcarrier spacing.

Figure 2:
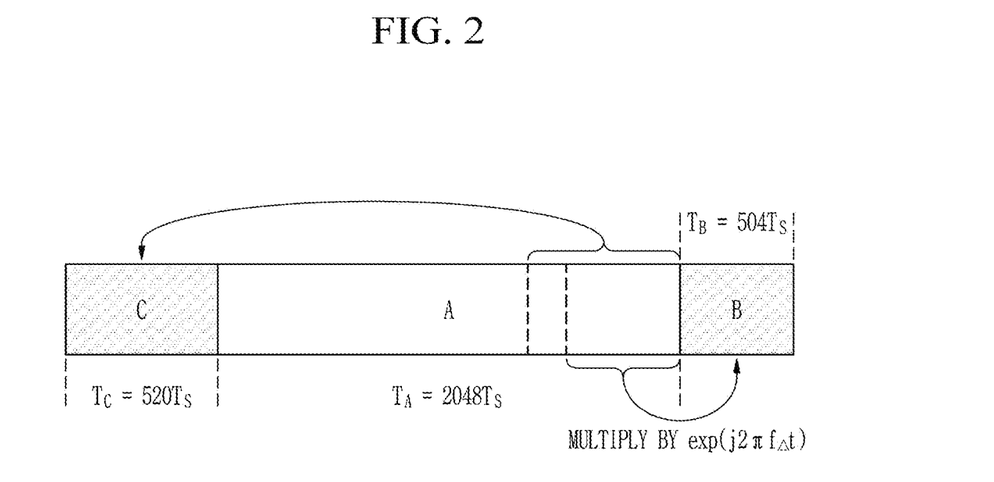
FIG. 2 is a diagram illustrating symbols having a CAB structure of the bootstrap signal in a time domain.
Figure 3:
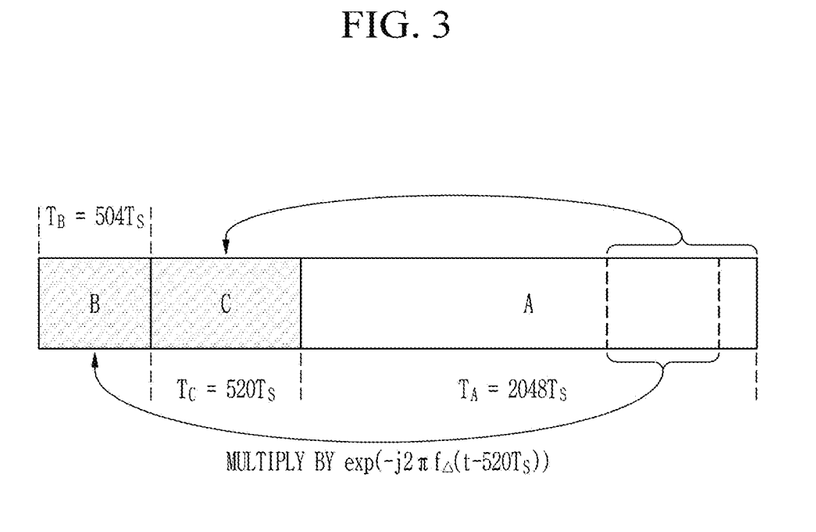
FIG. 3 is a diagram illustrating symbols of a BCA structure of the bootstrap signal in a time domain.

FIG. 2 is a diagram illustrating symbols having a CAB structure of the bootstrap signal in a time domain. FIG. 3 is a diagram illustrating symbols of a BCA structure of the bootstrap signal in a time domain.

Referring to FIGS. 2 and 3, a structure of the bootstrap signal in the time domain has repeated patterns as shown in FIGS. 2 and 3. The bootstrap signal may include four OFDM symbols in the time domain. The first symbol may be transmitted as the structure shown in FIG. 2. The structure of FIG. 2 may be expressed by Equation 1.

$$S_{CAB}^n(t) = \begin{cases} A_n(t+1528T_s) & 0 \le t < 520T_s \\ A_n(t-520T_s) & 520T_s \le t < 2568T_s \\ A_n(t-1024T_s)e^{j2\pi f_\Delta t} & 2568T_s \le t < 3072T_s \\ 0 & \text{otherwise} \end{cases} \quad \text{[Equation 1]}$$

The remaining symbols may be transmitted as the structure of FIG. 3. The structure of FIG. 3 may be expressed by Equation 2.

$$S_{CAB}^n(t) = \quad \text{[Equation 2]}$$
$$\begin{cases} A_n(t+1528T_s)e^{-j2\pi f_\Delta(t-520T_s)} & 0 \le t < 504T_s \\ A_n(t+1024T_s) & 504T_s \le t < 1024T_s \\ A_n(t-1024T_s)e^{j2\pi f_\Delta t} & 1024T_s \le t < 3072T_s \\ 0 & \text{otherwise} \end{cases}$$

The repeated pattern of the bootstrap signal enables time and frequency synchronization of the signal through a correlation calculation on the repeated pattern at the receiving side.

Figure 4:
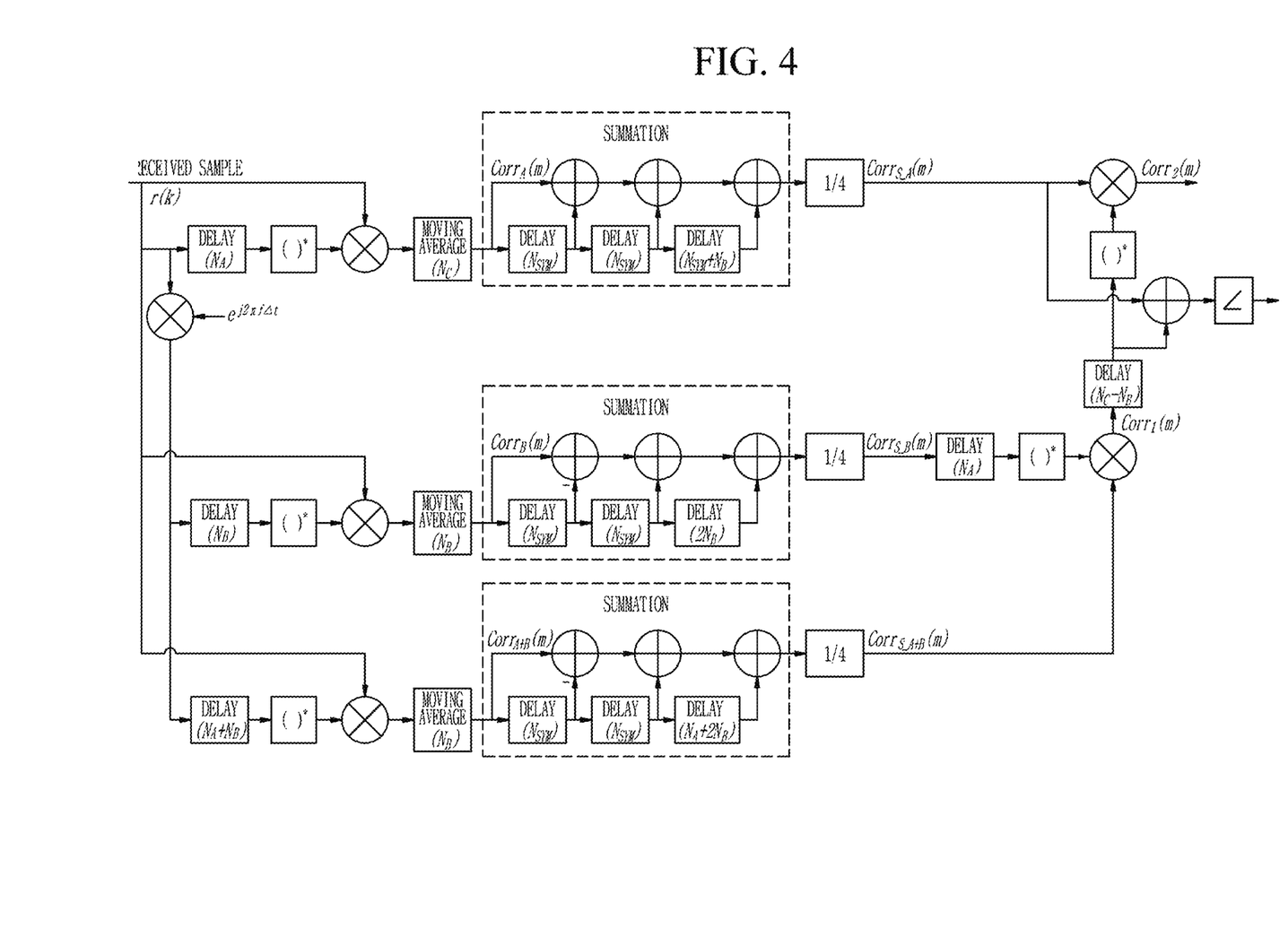
FIG. 4 is a block diagram of a synchronization device according to an embodiment.

FIG. 4 is a block diagram of a synchronization device according to an embodiment.

Referring to FIG. 4, a synchronization device according to an embodiment may estimate synchronization of a signal in the time domain and the frequency domain through a correlation result in the same sample interval. The synchronization device according to the embodiment may divide the bootstrap signal into three paths to perform correlation operations, and perform the correlation operations between signals respectively delayed by $N_A$, $N_B$, and $N_A+N_B$ in each path and non-delayed signals.

Figure 5:
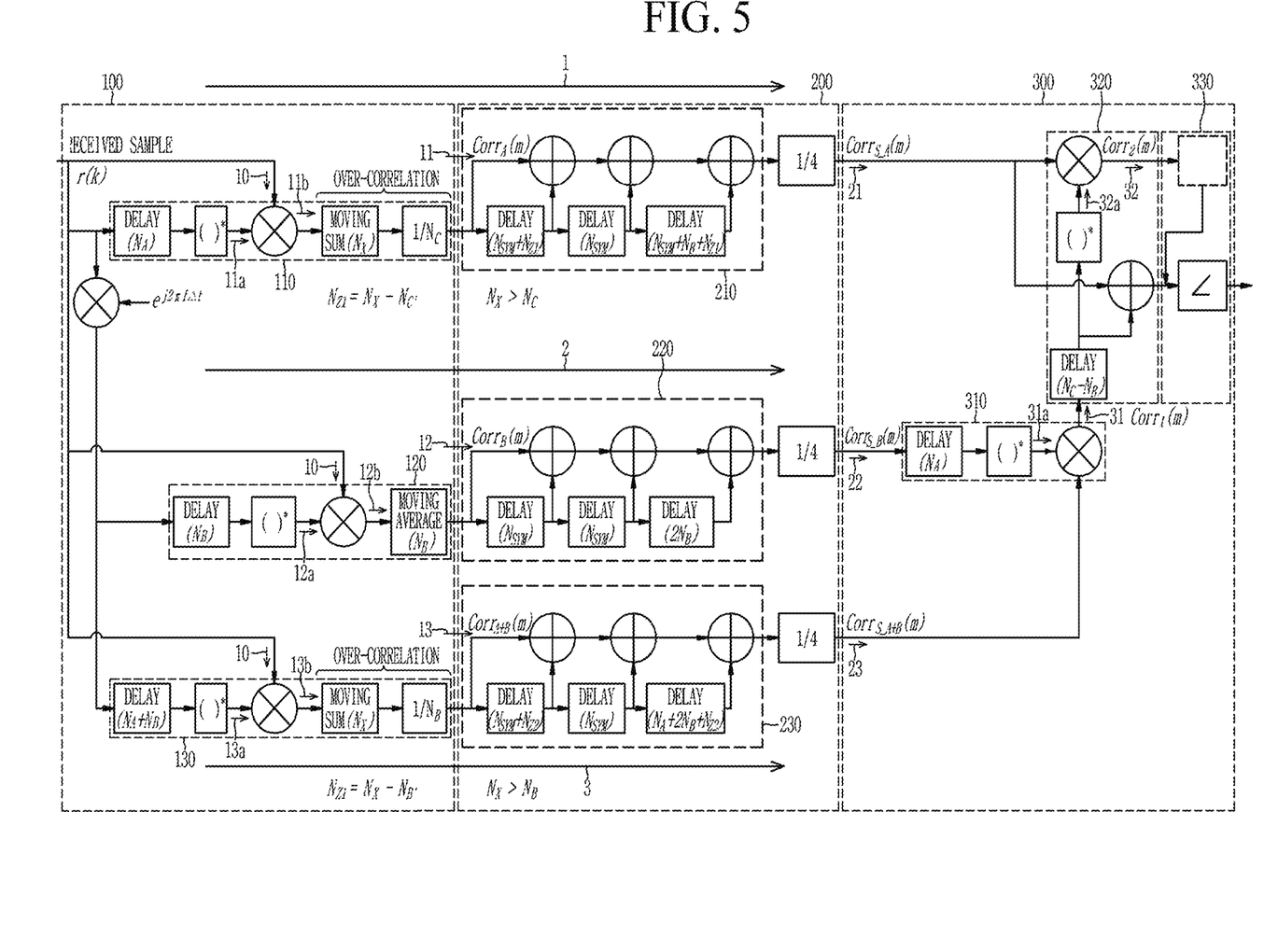
FIG. 5 is a block diagram of a synchronization estimation apparatus according to an embodiment.

FIG. 5 is a block diagram of a synchronization estimation apparatus according to an embodiment.

Referring to FIG. 5, a synchronization estimation apparatus according to an embodiment includes a correlator 100, a delayer 200, and a synchronization estimator 300.

The correlator 100 may perform a correlation operation using a correlation window on a plurality of synchronization estimation signals separated to a plurality of paths, and output a plurality of correlated signals. Each of the plurality of synchronization estimation signals may be a bootstrap signal. The bootstrap signal received in the state in which a frequency error occurs may be expressed by Equation 3.

$$r(k)=x(k)e^{j2\pi f_0 T_s k}+w(k) \quad \text{[Equation 3]}$$

In Equation 3, r(k) represents a received bootstrap signal, x(k) represents a transmitted bootstrap signal, and w(k) represents a Gaussian noise. Further, $f_0$ represents a frequency domain error, and $T_S$ represents a sampling ratio for the bootstrap signal.

The correlator 100 may perform an over-correlation operation on the first synchronization estimation signal 11b among the plurality of synchronization estimation signals, perform a general correlation operation on the second synchronization estimation signal 12b among the plurality of synchronization estimation signals, and perform an over-correlation operation on the third synchronization estimation signal 13b among the plurality of synchronization estimation signals. The correlator 100 may include a first correlator 110, a second correlator 120, and a third correlator 130.

The first correlator 110 may perform an over-correlation operation on the first synchronization estimation signal 11b separated to a first path 1 among a plurality of paths to generate a first correlated signal and output the first correlated signal 11. Here, in performing the over-correlation operation, the first correlator 110 may perform a moving sum operation on the first synchronization estimation signal 11b by using a correlation window having a first length $N_X$ and a dividing operation for a result of the moving sum operation by a third length $N_C$ shorter than the first length.

The first length $N_X$ is a preset and stored window length, and may be sufficiently longer than a second length $N_B$ and the third length $N_C$. $N_X$ means an integer greater than the $N_B$ and the $N_C$, and a correlation operation with a longer length may be performed through the value of $N_X$. The third length $N_C$ may be shorter than the second length $N_B$. Alternatively, the third length $N_C$ may be longer than or equal to the second length $N_B$. The first synchronization estimation signal 11b may be a correlated signal obtained by a correlation operation between the synchronization estimation signal 10 and a signal 11a delayed by a preset interval from a synchronization estimation signal 10. Here, the preset interval, for example, may be a fourth length $N_A$ shorter than the third length $N_C$.

The second correlator 120 may perform the general correlation operation on the second synchronization estimation signal 12b separated to a second path 2 among the plurality of paths to generate a second correlated signal, and output the second correlated signal 12. Here, in performing the general correlation operation, the second correlator 120 may perform a moving average operation on the second synchronization estimation signal 12b by using a correlation window having the second length $N_B$ shorter than the first length $N_X$.

The second synchronization estimation signal 12b may be a correlated signal obtained by a correlation operation between the synchronization estimation signal 10 and a signal 12a delayed by a preset interval from a frequency-shifted synchronization estimation signal 10. Here, the preset interval, for example, may be the second length $N_B$. Since two consecutive same sample intervals are included in a correlation window when the correlation window having the first length $N_X$ is used by the second correlator 120, the correlation window having the second length $N_B$ may be used.

The third correlator 130 may perform an over-correlation operation on the third synchronization estimation signal 13b among the plurality of synchronization estimation signals separated to a third route 3 among the plurality of paths to generate a third correlated signal, and output the third correlated signal 13. Here, in performing the over-correlation operation, the third correlator 130 may perform a moving sum operation on the third synchronization estimation signal 13b by using a correlation window having the first length $N_X$ and a dividing operation for a result of the moving sum operation by the second length $N_B$.

The third synchronization estimation signal 13b may be a correlated signal obtained by a correlation operation between the synchronization estimation signal 10 and a signal 13a delayed by a preset interval from a frequency-shifted synchronization estimation signal 10. Here, the preset interval, for example, may be a length obtained by adding the second length $N_B$ and the fourth length $N_A$.

The frequency-shifting operation may be performed by the second correlator 120 and the third correlator 130 according to a subcarrier interval. In the frequency-shifting operation, the structure of the bootstrap signal in the time domain may be considered.

The first correlated signal 11 of the first path 1 may be expressed by Equation 4.

$$Corr_A(m) = \frac{1}{N_C} \sum_{k=0}^{N_X-1} r^*(k+m-N_A)r(k+m) = \quad \text{[Equation 4]}$$

$$\frac{1}{N_C} \sum_{k=0}^{N_X-1} x^*(k+m-N_A)x(k+m)e^{j(\Delta\phi)N_A} + \tilde{w}_1(k,m)$$

In Equation 4, $\Delta\phi$ Denotes the phase rotation generated by $f_0$, and $\tilde{w}_1(k,m)$ denotes the noise term that occurs when the Gaussian noise of Equation 3 is multiplied by the existing transmission signal terms.

The second correlated signal 12 of the second path 2 may be expressed by Equation 5, and the third correlated signal 13 of the third path 3 may be expressed by Equation 6.

$$Corr_B(m) = \frac{1}{N_B} \sum_{k=0}^{N_B-1} r^*(k+m-N_B)r(k+m) = \quad \text{[Equation 5]}$$

$$\frac{1}{N_B} \sum_{k=0}^{N_B-1} x^*(k+m-N_B)x(k+m)e^{j(\Delta\phi)N_B} + \tilde{w}_2(k,m)$$

$$Corr_{A+B}(m) = \frac{1}{N_B} \sum_{k=0}^{N_X-1} r^*(k+m-N_A-N_B)r(k+m) = \quad \text{[Equation 6]}$$

$$\frac{1}{N_B} \sum_{k=0}^{N_X-1} x^*(k+m-N_A-N_B)x(k+m)e^{j(\Delta\phi)(N_A+N_B)} +$$

$$\tilde{w}_3(k,m)$$

Since all samples within a non-equal sample interval are represented by the same magnitude and the arbitrary phase, if $N_X$ is large enough, the result of the moving sum operation may be close to zero.

Figure 6:
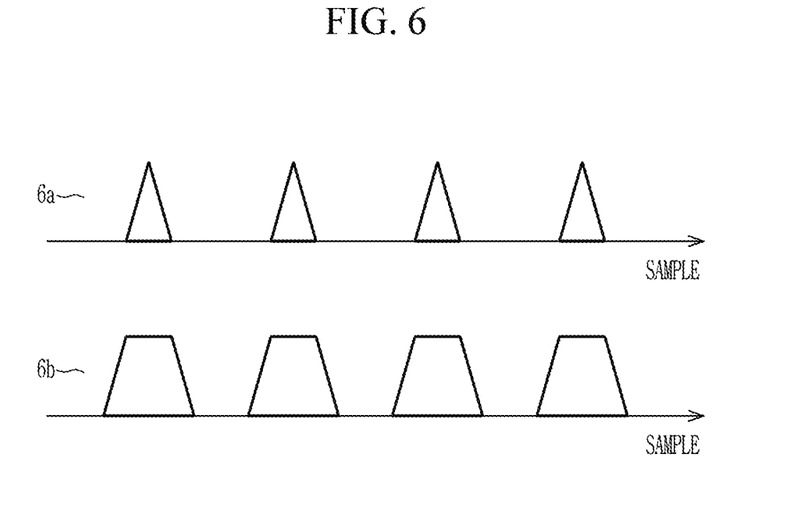
FIG. 6 is a graph of a correlated signal in a synchronization estimation apparatus according to an embodiment.

FIG. 6 is a graph of a correlated signal in a synchronization estimation apparatus according to an embodiment.

Referring to FIG. 6, the first graph 6a is a correlated signal in a synchronization device according to an embodiment. A triangular signal is output through a correlation operation in four identical sample intervals for all three paths by the synchronization device according to an embodiment. The synchronization device according to an embodiment may find one maximum value by sorting the correlated signals of the four identical sample intervals to estimate synchronization timing in the time domain.

When the correlation operation is performed only in the same sample interval, the triangular signal may be output. Since the triangle-shaped result of the correlation operation has only one maximum value, the estimation of the synchronization timing may be less affected by noise than other types of the correlation operation.

The second graph 6b is a correlated signal in the synchronization estimation apparatus according to an embodiment. Since the synchronization estimation apparatus according to the embodiment employs a correlator using a longer length than the same sample length, a trapezoidal signal may be output. Since the correlation operation is performed for a longer interval, a trapezoidal signal may exhibit better performance in terms of SNR than the triangular signal.

Figure 7:
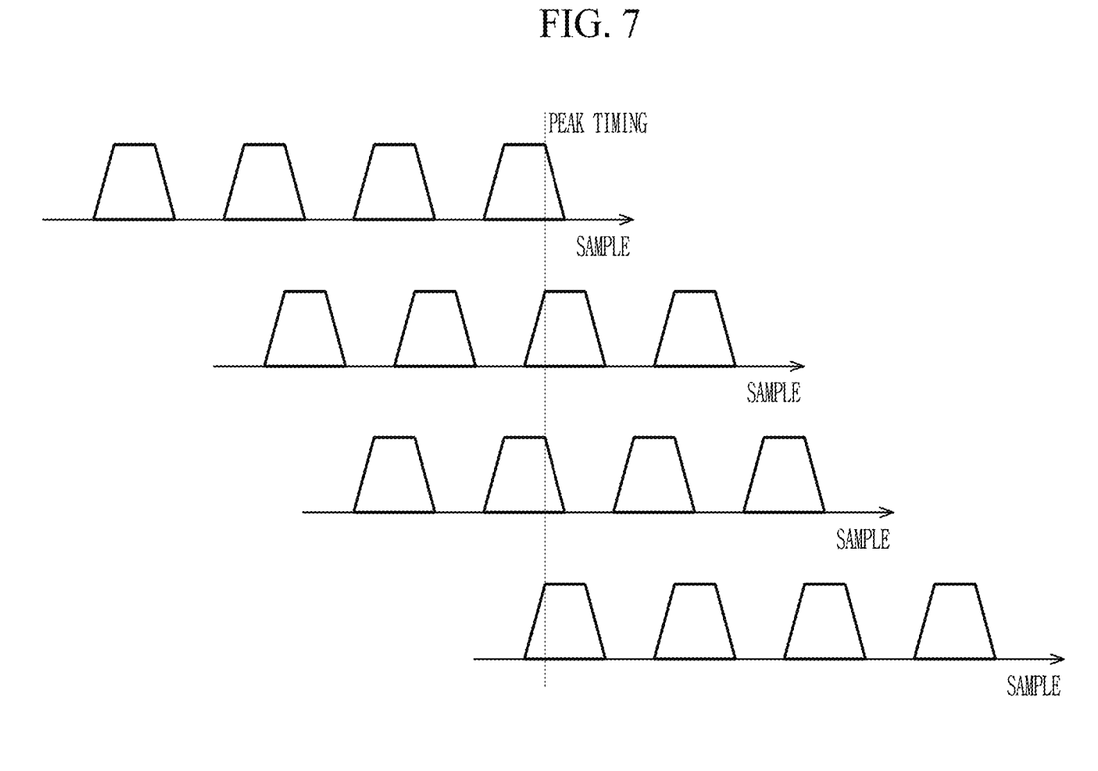
FIG. 7 is a graph illustrating alignment of correlated signals in a synchronization estimation apparatus according to an embodiment.

FIG. 7 is a graph illustrating alignment of correlated signals in a synchronization estimation apparatus according to an embodiment.

Referring to FIGS. 5 and 7, the delayer 200 may delay the plurality of correlated signals to output a plurality of delayed signals. The delayer 200 may delay a plurality of correlated signals of which shape is trapezoid and output the plurality of delayed signals of which shape is triangle with a plurality of identical sample interval. The delayer 200 may delay the length of the upper side of the trapezoid for some of the same sample intervals among the plurality of identical sample intervals.

Specifically, the delayer 200 of the synchronization estimation apparatus according to the embodiment may delay the same length as the synchronization apparatus in FIG. 4 for the first and third identical sample intervals. Then the delayer 200 of the synchronization estimation apparatus according to the embodiment may delay the length of the upper side of the trapezoid for the second and third identical sample intervals to output the triangular signal.

The delayer 200 may include a first delayer 210, a second delayer 220, and a third delayer 230.

The first delayer 210 may perform an operation for delaying the first correlated signal 11 to generate a first delayed signal and output the first delayed signal 21. The first delayed signal 21 is expressed by Equation 7.

$$Corr_{S,A}(m) = \frac{1}{4}\{Corr_A(m) + Corr_A(m - N_{Sym}) + Corr_A(m - 2N_{Sym}) + Corr_A(m - 3N_{Sym} - N_B)\} \quad \text{[Equation 7]}$$

The second delayer 220 may perform an operation for delaying the second correlated signal 12 to generate a second delayed signal and output the second delayed signal 22. The second delayed signal 22 is expressed by Equation 8.

$$Corr_{S,B}(m) = \frac{1}{4}\{Corr_B(m) Corr_B(m - N_{Sym}) + Corr_B(m - 2N_{Sym}) + Corr_B(m - 2N_{Sym} - 2N_B)\} \quad \text{[Equation 8]}$$

The third delayer 230 may perform an operation for delaying the third correlated signal 13 to generate a third delayed signal and output the third delayed signal 23. The third delayed signal 23 is expressed by Equation 9.

$$Corr_{S,A+B}(m) = \frac{1}{4}\{Corr_{A+B}(m) - Corr_{A+B}(m - N_{Sym}) + Corr_{A+B}(m - 2N_{Sym}) + Corr_{A+B}(m - 2N_{Sym} - N_A - 2N_B)\} \quad \text{[Equation 9]}$$

The delay operation or alignment operation by the delayer 200 may convert a trapezoidal correlated signal with improved SNR into a triangular-shaped signal which is advantageous for signal detection. Through this, the accuracy of the estimation can be improved.

Figure 8:
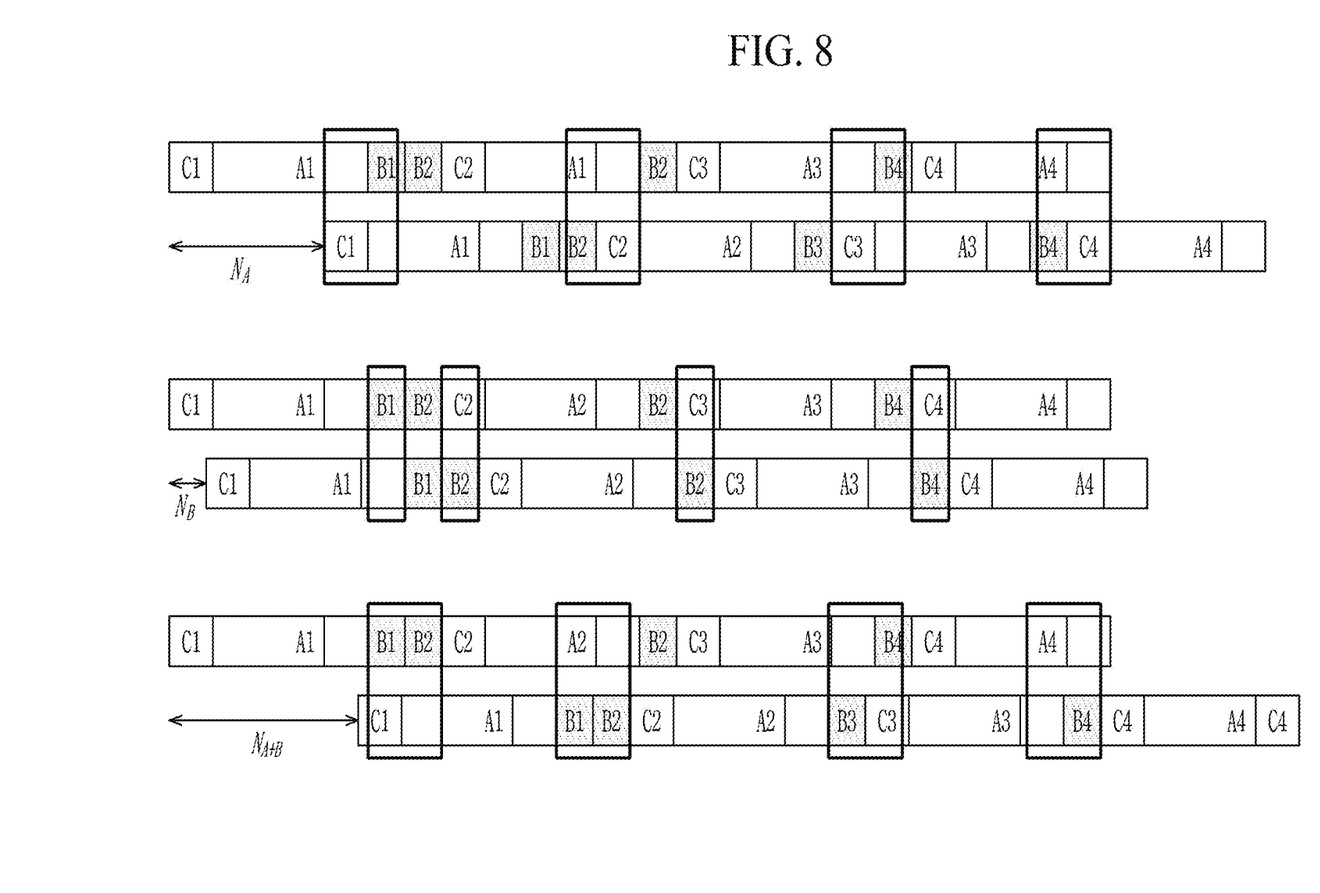
FIG. 8 is a diagram illustrating a correlation window when a maximum correlation value is output according to an embodiment.

FIG. 8 is a diagram illustrating a correlation window when a maximum correlation value is output according to an embodiment.

Referring to FIGS. 5 and 8, the synchronization estimation apparatus according to the embodiment may perform a correlation operation for a longer interval in the first path 1 and the third path 3 than the synchronization apparatus in FIG. 4.

Referring to FIG. 5, the synchronization estimator 300 may estimate the synchronization by using the plurality of delayed signals. The synchronization estimator 300 may include a first estimator 310, a second estimator 320, and a third estimator 330.

The first estimator 310 may perform a correlation operation on the third delayed signal 23 and the signal 31a delayed from the second delayed signal to generate a first estimated signal, and output the first estimated signal 31.

The first estimated signal 31 may be expressed by Equation 10. Equation 10 shows a process of multiplying operation in which the correlated signals of the second path 2 and the third path 3 are delayed to be located the positions of the maximum correlation values.

$$Corr_1(m) = \{Corr_{S,B}(m - N_A)\}^* Corr_{S,A+B}(m) \quad \text{[Equation 10]}$$

The second estimator 320 may perform a correlation operation on the first delayed signal 21 and the signal 32a delayed from the first estimated signal 31 to generate a second estimated signal, and output the second estimated signal 32. The second estimated signal 32 is expressed by Equation (11).

$$Corr_2(m) = \{Corr_1(m - (N_C - N_B))\}^* Corr_{S,A}(m) \quad \text{[Equation 11]}$$

The multiplying operation on the correlated signals of the three paths makes the reduced area in a form of the triangle a form of a quadratic function while maintaining the position of the maximum correlation value. This can make timing estimation less sensitive to the noise.

The synchronization estimation value in the time domain obtained by the synchronization estimation apparatus according to the embodiment may be used to determine an estimation value in the frequency domain.

The third estimator 330 may estimate the synchronization in the time domain and the frequency domain by using the first estimated signal 31 and the second estimated signal 32. Equation 12 represents a process of estimating the synchronization timing in the time domain through Equation 11, and Equation 13 represents a process of using the estimation value an estimate in the time domain for estimating the timing in the frequency domain.

$$\hat{m} = \underset{m}{\mathrm{argmax}}\{Corr_2(m)\} \quad \text{[Equation 12]}$$

$$\hat{f}_0 = \frac{1}{2\pi T_S N_A} \angle(Corr_{S,A}(\hat{m}) + Corr_1(\hat{m} - (N_C - N_B))) \quad \text{[Equation 13]}$$

In Equation 12, $\hat{m}$ is an estimation value of the synchronization in the time domain obtained through the maximum correlation value, and $\hat{f}_0$ represents an estimation value of the synchronization in the frequency domain obtained through the phase of the maximum correlation value at the position of $\hat{m}$.

According to the synchronization estimation device according to the embodiment, since the estimation value in the time domain can be obtained with higher accuracy than the synchronization device of FIG. 4, the accuracy for estimation of the frequency domain can be improved.

Figure 9:
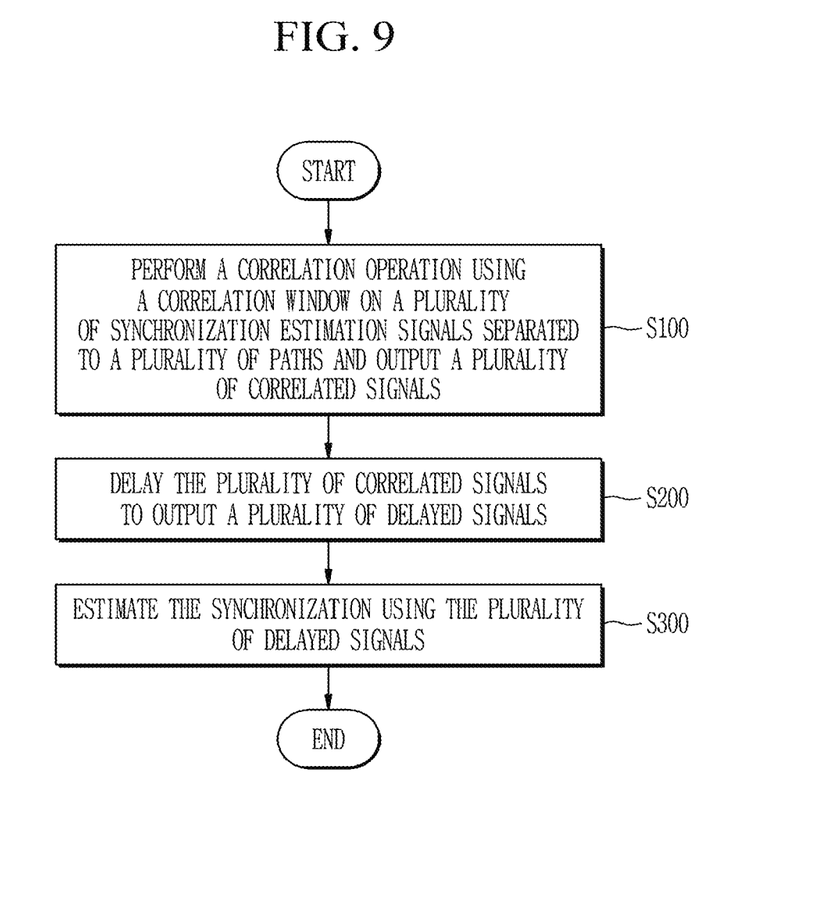
FIGS. 9 and 10 are flowcharts of a method for estimating the synchronization of the broadcast signal in the time domain according to an embodiment.
Figure 10:
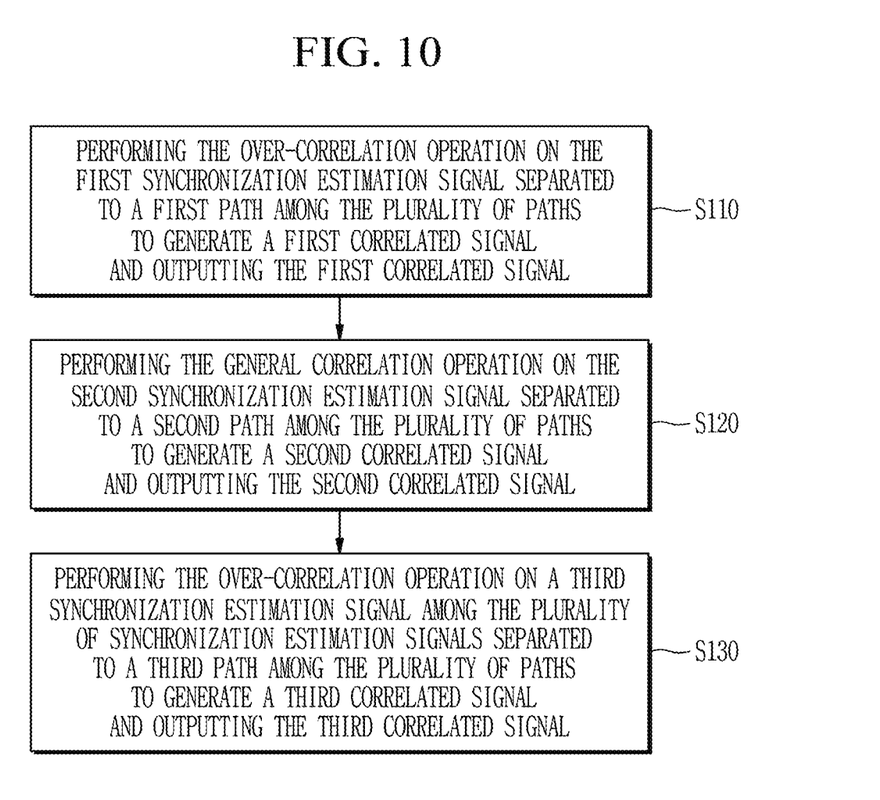

FIGS. 9 and 10 are flowcharts of a method for estimating the synchronization of the broadcast signal in the time domain according to an embodiment.

Referring to FIG. 9, the synchronization estimation method according to an embodiment may include performing a correlation operation using a correlation window on a plurality of synchronization estimation signals separated to a plurality of paths and output a plurality of correlated signals (S100). Further, the synchronization estimation method may include delaying the plurality of correlated signals to output a plurality of delayed signals (S200), and estimating synchronization by using the plurality of delayed signals (S300). The performing a correlation operation using a correlation window on a plurality of synchronization estimation signals separated to a plurality of paths and outputting a plurality of correlated signals includes: performing the over-correlation operation on the first synchronization estimation signal among the synchronization estimation signals; and performing the general correlation operation on the second synchronization estimation signal among the plurality of synchronization estimation signals.

The performing of the over-correlation operation may be performing the moving sum operation on the first synchronization estimation signal by using a first correlation window having the first length. The performing of the general correlation operation may be performing the moving average operation on the second synchronization estimation signal by using a second correlation window having the second length shorter than the first length.

The performing a correlation operation using a correlation window on a plurality of synchronization estimation signals separated to a plurality of paths and outputting a plurality of correlated signals (S100) may include performing the over-correlation operation on the first synchronization estimation signal separated to a first path among the plurality of paths to generate a first correlated signal and outputting the first correlated signal (S110), performing the general correlation operation on the second synchronization estimation signal separated to a second path among the plurality of paths to generate a second correlated signal and outputting the second correlated signal (S120), and performing the over-correlation operation on a third synchronization estimation signal among the plurality of synchronization estimation signals separated to a third path among the plurality of paths to generate a third correlated signal and outputting the third correlated signal (S130). In this case the over-correlation operation may correspond to a moving sum operation on the first synchronization estimation signal and the third synchronization estimation signal by using a first correlation window having a first length, and the general correlation operation may correspond to a moving average operation on a second synchronization estimation signal by using a second correlation window having a second length shorter than the first length.

In S120, a dividing operation for the result of the moving sum operation by the third length shorter than the first length may be performed.

In S130, a dividing operation for the result of the moving sum operation by the second length may be performed.

In S200, delaying the plurality of correlated signals of which shape is trapezoid and outputting the plurality of delayed signals of which shape is triangle with a plurality of identical sample interval may be performed.

In S200, outputting a first delayed signal by delaying the first correlated signal, outputting a second delayed signal by delaying the second correlated signal, and outputting a third delayed signal by delaying the third correlated signal may be performed.

In S300, performing a correlation operation on the third delayed signal and a signal delayed from the second delayed signal to generate a first estimated signal, and outputting the first estimated signal; and performing a correlation operation on a signal delayed from the first estimated signal and the first delayed signal to generate a second estimated signal, and outputting the second estimated signal may be performed.

Figure 11:
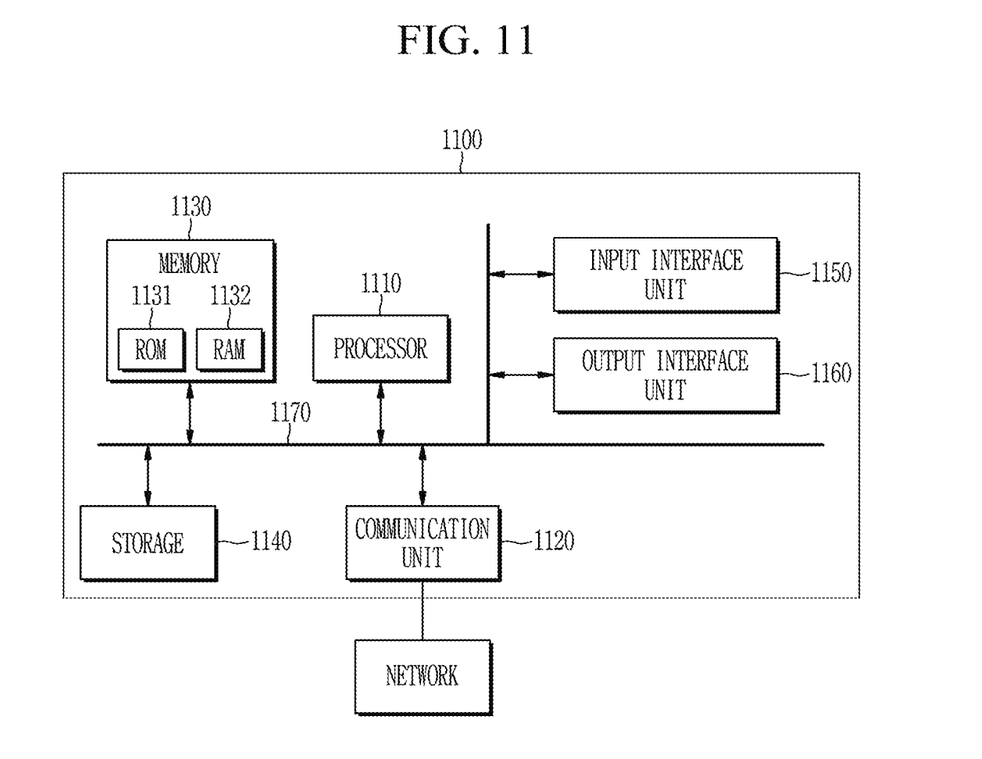
FIG. 11 is a block diagram of a synchronization estimation apparatus according to another embodiment.

FIG. 11 is a block diagram of a synchronization estimation apparatus according to another embodiment.

The synchronization estimation apparatus according to another exemplary embodiment may be implemented as a computer system, for example a computer readable medium. Referring to FIG. 11, a computer system 1100 may include at least one of processor 1110, a memory 1130, an input interface unit 1150, an output interface unit 1160, and storage 1140. The computer system 1100 may also include a communication unit 1120 coupled to a network. The processor 1110 may be a central processing unit (CPU) or a semiconductor device that executes instructions stored in the memory 1130 or storage 1140. The memory 1130 and the storage 1140 may include various forms of volatile or non-volatile storage media. For example, the memory may include read only memory (ROM) 1131 or random access memory (RAM) 1132. In the exemplary embodiment of the present disclosure, the memory may be located inside or outside the processor, and the memory may be coupled to the processor through various means already known. Thus, the embodiments may be embodied as a computer-implemented method or as a non-volatile computer-readable medium having computer-executable instructions stored thereon. In the exemplary embodiment, when executed by a processor, the computer-readable instructions may perform the method according to at least one aspect of the present disclosure. The communication unit 1120 may transmit or receive a wired signal or a wireless signal. On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

The synchronizing estimation apparatus according to the another embodiment includes a processor 1110 and a memory 1130, and the processor 1110 executes a program stored in the memory 1130 to perform: performing a correlation operation using a correlation window on a plurality of synchronization estimation signals separated to a plurality of paths and outputting a plurality of correlated signals; delaying the plurality of correlated signals to output a plurality of delayed signals; and estimating the synchronization using the plurality of delayed signals. When performing the correlation operation using the correlation window on the plurality of synchronization estimation signals separated to the plurality of paths and outputting the plurality of correlated signals, the processor executes the program to perform an over-correlation operation on a first synchronization estimation signal among the plurality of synchronization estimation signals and a general correlation operation on a second synchronization estimation signal among the plurality of synchronization estimation signals.

While this disclosure has been described in connection with what is presently considered to be practical example embodiments, it is to be understood that this disclosure is not limited to the disclosed embodiments, but, on the contrary, is intended to cover various modifications and equivalent arrangements included within the spirit and scope of the appended claims.

What is claimed is:

1. An apparatus for estimating synchronization of a broadcast signal in a time domain using a synchronization estimation signal, the apparatus comprising:
   a correlator configured to perform a correlation operation on a plurality of synchronization estimation signals separated to a plurality of paths and output a plurality of correlated signals;

a delayer configured to delay the plurality of correlated signals to output a plurality of delayed signals; and a synchronization estimator configured to estimate the synchronization using the plurality of delayed signals, wherein the correlator is further configured to perform an over-correlation operation on a first synchronization estimation signal among the plurality of synchronization estimation signals, and to perform a general correlation operation on a second synchronization estimation signal among the plurality of synchronization estimation signals, wherein the over-correlation operation on the first synchronization estimation signal uses a first correlation window having a first length, and wherein the general correlation operation on the second synchronization estimation signal uses a second correlation window having a second length shorter than the first length.

2. The apparatus of claim 1,
wherein when performing the over-correlation operation, the correlator performs
a moving sum operation on the first synchronization estimation signal using the first correlation window having the first length.

3. The apparatus of claim 2,
wherein when performing the general correlation operation, the correlator performs
a moving average operation on the second synchronization estimation signal using the second correlation window having the second length shorter than the first length.

4. The apparatus of claim 1,
wherein the correlator includes:
a first correlator configured to perform the over-correlation operation on the first synchronization estimation signal separated to a first path among the plurality of paths to generate a first correlated signal and outputting the first correlated signal;
a second correlator configured to perform the general correlation operation on the second synchronization estimation signal separated to a second path among the plurality of paths to generate a second correlated signal and outputting the second correlated signal; and
a third correlator configured to perform the over-correlation operation for a third synchronization estimation signal among the plurality of synchronization estimation signals separated to a third path among the plurality of paths to generate a third correlated signal and outputting the third correlated signal,
wherein the over-correlation operation corresponds to a moving sum operation on the first synchronization estimation signal and the third synchronization estimation signal by using the first correlation window having the first length, and the general correlation operation corresponds to a moving average operation on a second synchronization estimation signal by using the second correlation window having the second length shorter than the first length.

5. The apparatus of claim 4,
wherein when performing the over-correlation operation, the first correlator performs
a dividing operation for a result of the moving sum operation by a third length shorter than the first length.

6. The apparatus of claim 4,
wherein when performing the over-correlation operation, the third correlator performs
a dividing operation a result of the moving sum operation by the second length.

7. The apparatus of claim 1,
wherein when outputting the plurality of delayed signals, the delayer performs
delaying the plurality of correlated signals of which shape is trapezoid and outputting the plurality of delayed signals of which shape is triangle with a plurality of identical sample intervals.

8. The apparatus of claim 4,
wherein the delayer includes:
a first delayer configured to perform a delaying operation on the first correlated signal to generate a first delayed signal and outputting the first delayed signal;
a second delayer configured to perform a delaying operation on the second correlated signal to generate a second delayed signal outputting the second delayed signal; and
a third delayer configured to perform a delaying operation on the third correlated signal to generate a third delayed signal and outputting the third delayed signal.

9. The apparatus of claim 8,
Wherein the synchronization estimator includes:
a first estimator configured to perform a correlation operation on the third delayed signal and a signal delayed from the second delayed signal to generate a first estimated signal, and outputting the first estimated signal; and
a second estimator configured to perform a correlation operation on a signal delayed from the first estimated signal and the first delayed signal to generate a second estimated signal, and outputting the second estimated signal.

10. A method for estimating synchronization of a broadcast signal in a time domain using a synchronization estimation signal, the method comprising:
performing a correlation operation on a plurality of synchronization estimation signals separated to a plurality of paths and outputting a plurality of correlated signals;
delaying the plurality of correlated signals to output a plurality of delayed signals; and
estimating the synchronization using the plurality of delayed signals,
wherein the performing a correlation operation on a plurality of synchronization estimation signals separated to a plurality of paths and outputting a plurality of correlated signals includes: performing an over-correlation operation on a first synchronization estimation signal among the plurality of synchronization estimation signals; and performing a general correlation operation on a second synchronization estimation signal among the plurality of synchronization estimation signals,
wherein the over-correlation operation on the first synchronization estimation signal uses a first correlation window having a first length, and
wherein the general correlation operation on the second synchronization estimation signal uses a second correlation window having a second length shorter than the first length.

11. The method of claim 10,
wherein the performing of the over-correlation operation includes performing a moving sum operation on the first synchronization estimation signal using the first correlation window having the first length.

12. The method of claim 11,
wherein the performing of the general correlation operation includes performing a moving average operation on the second synchronization estimation signal using the second correlation window having the second length shorter than the first length.

13. The method of claim 10,
wherein performing the correlation operation on the plurality of synchronization estimation signals separated to a plurality of paths and outputting a plurality of correlated signals includes:
performing the over-correlation operation on the first synchronization estimation signal separated to a first path among the plurality of paths to generate a first correlated signal and outputting the first correlated signal;
performing the general correlation operation on the second synchronization estimation signal separated to a second path among the plurality of paths to generate a second correlated signal and outputting the second correlated signal; and
performing the over-correlation operation on a third synchronization estimation signal among the plurality of synchronization estimation signals separated to a third path among the plurality of paths to generate a third correlated signal and outputting the third correlated signal,
wherein the over-correlation operation corresponds to a moving sum operation on the first synchronization estimation signal and the third synchronization estimation signal using the first correlation window having the first length, and the general correlation operation corresponds to a moving average operation on a second synchronization estimation signal using the second correlation window having the second length shorter than the first length.

14. The method of claim 13,
wherein the outputting of the first correlated signal includes
performing a dividing operation for a result of the moving sum operation by a third length shorter than the first length.

15. The method of claim 13,
wherein the outputting of the third correlated signal includes
performing a dividing operation for a result of the moving sum operation by the second length.

16. The method of claim 10,
wherein the delaying the plurality of correlated signals to output a plurality of delayed signals includes
delaying the plurality of correlated signals of which shape is trapezoid and outputting the plurality of delayed signals of which shape is triangle with a plurality of identical sample intervals.

17. The method of claim 13,
wherein the delaying the plurality of correlated signals to output a plurality of delayed signals includes
outputting a first delayed signal by delaying the first correlated signal, outputting a second delayed signal by delaying the second correlated signal, and outputting a third delayed signal by delaying the third correlated signal.

18. The method of claim 17,
wherein the estimating the synchronization using the plurality of delayed signals includes:
performing a correlation operation on the third delayed signal and a signal delayed from the second delayed signal to generate a first estimated signal, and outputting the first estimated signal; and performing a correlation operation on a signal delayed from the first estimated signal and the first delayed signal to generate a second estimated signal, and outputting the second estimated signal.

19. An apparatus for estimating synchronization of a broadcast signal in a time domain using a synchronization estimation signal, the apparatus comprising:
a processor and memory, wherein the processor executes a program stored in the memory to perform:
performing a correlation operation on a plurality of synchronization estimation signals separated to a plurality of paths and outputting a plurality of correlated signals;
delaying the plurality of correlated signals to output a plurality of delayed signals; and
estimating the synchronization using the plurality of delayed signals,
wherein when performing the correlation operation on the plurality of synchronization estimation signals separated to the plurality of paths and outputting the plurality of correlated signals, the processor executes the program to perform: an over-correlation operation on a first synchronization estimation signal among the plurality of synchronization estimation signals and a general correlation operation on a second synchronization estimation signal among the plurality of synchronization estimation signals,
wherein the over-correlation operation uses a first correlation window having a first length, and the general correlation operation uses a second correlation window having a second length shorter than the first length.

20. The apparatus of claim 1, wherein the correlator is further configured to:
generate the first synchronization estimation signal using a first correlation delay; and
generate the second synchronization estimation signal using a second correlation delay different from the first correlation delay.

* * * * *